Nov. 3, 1925.
H. MAGER
1,560,392
MEASURING APPARATUS FOR BOARDS
Filed July 22, 1925
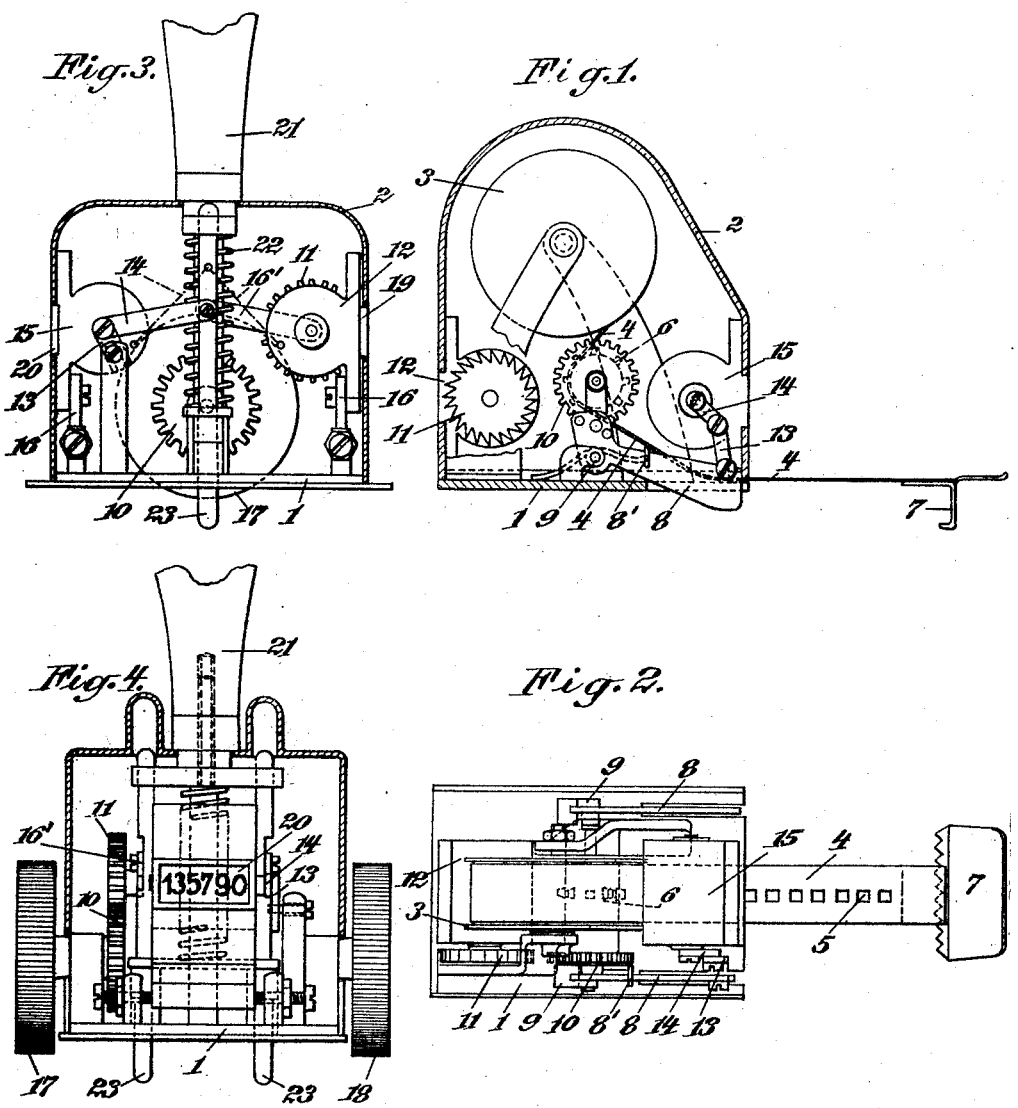
INVENTOR
Herbert Mager
By
ATTORNEYS Patented Nov. 3, 1925.

1,560,392

UNITED STATES PATENT OFFICE.

HERBERT MAGER, OF VIENNA, AUSTRIA.

MEASURING APPARATUS FOR BOARDS.

Application filed July 22, 1925. Serial No. 45,376.

*To all whom it may concern:*

Be it known that I, HERBERT MAGER, a citizen of the Republic of Austria, residing at Vienna, Austria, have invented certain new and useful Improvements in Measuring Apparatus for Boards, of which the following is a specification.

This invention relates to measuring apparatus which automatically determines both the dimensions of boards, the sum of the values measured, and also the number of boards measured.

The combination of a measuring tape with a counting mechanism is in itself already known, and the combination of a timber-measuring apparatus (tree-measuring device) with counting mechanisms that indicate the number of items measured is also known.

The present invention is essentially distinguished from the known devices by special provisions for preventing an unintentional or fraudulent actuation of the counting mechanisms apart from the actual measuring operation. The measuring apparatus is actuated by the base plate thereof being drawn along over the object to be measured, and possesses for this purpose, according to the invention, organs which project beyond this base plate and which are pressed back by placing the measuring apparatus upon the article to be measured, and by means of such backward motion couple the counting mechanisms with the measuring organ itself.

The actual measuring apparatus can be constructed according to various principles. For instance the actual measuring process is effected either by drawing off a measuring tape, which is adapted to abut against one end of the object to be measured and which is unrolled by the travelling of the measuring apparatus along the object to be measured, or the said process is carried out by means of rollers, the rotation of which is registered when travelling over the object to be measured.

Two constructional examples of the invention are illustrated in the accompanying drawings.

Fig. 1 shows the device in sectional side elevation, and

Fig. 2 shows in plan view, a measuring apparatus provided with a measuring tape with the casing broken away.

Fig. 3 illustrates the device in sectional side elevation, and Fig. 4 shows a sectional front view of a modified measuring apparatus provided with a measuring roller.

In the measuring apparatus illustrated in Figs. 1 and 2, on a base plate 1 is mounted a casing 2, in which the entire mechanism is lodged. The measuring tape drum 3 constantly tends, owing to a spring in its interior, to rotate in such a way that the measuring tape 4 is rolled up.

The measuring tape is provided with perforations 5, in which engage the teeth on a roller 6, interposed in the path of the measuring tape. At the end the measuring tape is provided with an applying fillet or edge piece 7, which is secured to the edge of the board. The roller 6 is supported between the adjacent ends of two parallel double-armed bell-crank levers 8, pivotally mounted on shaft 9. The other ends of said bell-crank, due to the influence of the springs 8' (Figure 1), project beyond the bottom plate through slots in the latter. When the apparatus is mounted on the board to be measured, the levers are rocked about their common pivot such that the outer ends move into the plane of the bottom plate. By this means a toothed wheel 10, integral with the roller 6, comes into engagement with the ratchet wheel 11 of the measurement registering mechanism 12, of a construction known in itself. If the apparatus is drawn over the board to be measured with a constant application pressure, while the applying fillet 7 is secured to the edge of the board, the measuring tape unrolls, the toothed wheel 10 also rotates with it, owing to the engagement of the perforations with the teeth on roller 6, and the toothed wheel 10 feeds the measurement registering mechanism 12 forward. A pawl, not shown, prevents the said mechanism from rotating backwards. As soon as the apparatus arrives at the opposite edge of the board, the depressed lever ends snap over it, as a result of which the measurement registering mechanism comes out of engagement.

By the rocking of the lever caused on placing the bottom plate upon the article to be measured, the piece-counting mechanism 15 is fed one unit forwards by means of the two pivoted levers 13 and 14.

The indications of the piece-counting and measurement registering mechanisms may be read through the windows in the casing 2 indicated in Figure 1.

In the measuring apparatus illustrated in Figs. 3 and 4, on a base plate 1 is mounted a casing 2, in which the entire mechanism is lodged. Grooved rollers 17 and 18, projecting a small distance beyond the base plate 1, are mounted on shafts extending through the sides of the casing. A toothed wheel 10 is secured to the shaft of the roller 17 and is rotated by the latter in case the apparatus is moved along the board to be measured. The measurement registering mechanism 12 is mounted tiltably by means of a lever 16 and by the medium of connecting rods 16' is connected to two vertical pins 23, which pass through and extend out of the base plate 1 owing to the action of springs 22. When the apparatus is mounted on the board to be measured, the pins 23 are forced upward and the connecting rods 16' take up the position indicated in dash-dotted lines in Fig. 3. Thereby the measurement registering mechanism is rocked inward and its toothed wheel 11 now engages the toothed wheel 10. If the apparatus is placed onto the edge of the board and drawn over the length to be measured with a constant application pressure, the inwardly forced pins will maintain the measurement registering mechanism in operative engagement with grooved rollers 17, until the pins snap over the end of the board on reaching the opposite edge thereof.

By the depression of the pins 23 caused on placing the apparatus upon the article to be measured, the piece-counting mechanism 15 is fed one unit forward by means of the pivoted levers 13 and 14. The counting mechanisms may be read through the windows 19 and 20, arranged in the casing 2.

A handle 21 serves for facilitating the handling of the apparatus.

I claim:—

1. An apparatus for measuring boards, comprising in combination a casing, a measuring device, movable pins arranged in the said casing, one end of the said pins projecting out of the base-plate of the casing, a spring for resiliently maintaining the pins in this position, an oscillating measurement registering mechanism, pivoted rods connecting the latter with the said pins, and a piece-counting mechanism adapted to cooperate with the said pins.

2. An apparatus for measuring boards, comprising in combination a casing, a measuring device, movable pins arranged in the said casing, one end of the said pins projecting out of the base-plate of the casing, a spring for resiliently maintaining the pins in this position, a measurement registering mechanism connected with the said pins, a grooved roller for actuating the said mechanism, and a piece-counting mechanism adapted to cooperate with the said pins.

3. An apparatus for measuring boards, comprising in combination a casing, a measuring device, movable pins arranged in the said casing, one end of the said pins projecting out of the base-plate of the casing, a spring for resiliently maintaining the pins in this position, an oscillating measurement registering mechanism, pivoted rods connecting the latter with the said pins, a grooved roller for actuating the said mechanism, and a piece-counting mechanism adapted to cooperate with the said pins.

In testimony whereof I affix my signature.

HERBERT MAGER.